United States Patent
Hon (10) Patent No.: US 9,586,512 B2
(45) Date of Patent: Mar. 7, 2017

(54) SHACKLE AND METHOD FOR STABILIZING A VEHICLE DURING TRANSPORT

(71) Applicant: Charlie R. Hon, Yorba Linda, CA (US)

(72) Inventor: Charlie R. Hon, Yorba Linda, CA (US)

(*) Notice: Subject to any disclaimer, the term of this patent is extended or adjusted under 35 U.S.C. 154(b) by 0 days.

(21) Appl. No.: 14/692,636

(22) Filed: Apr. 21, 2015

(65) Prior Publication Data
US 2016/0311359 A1     Oct. 27, 2016

(51) Int. Cl.
*B60P 7/08*     (2006.01)
*B60P 3/073*    (2006.01)
*B60P 3/079*    (2006.01)

(52) U.S. Cl.
CPC .............. *B60P 3/073* (2013.01); *B60P 3/079* (2013.01); *B60P 7/08* (2013.01)

(58) Field of Classification Search
CPC .............. B60P 3/073; B60P 7/08; B60P 3/079
USPC ... 410/2–4, 7, 9–11, 19, 22, 23, 96, 97, 100, 410/102, 106, 116, 120; 24/265 CD, 334, 24/24, 510, 67.7, 499, 500; 248/499, 248/231.51, 230.4, 228.4, 316.5, 228.7, 248/74.1, 74.2, 74.3, 230.7, 231.81; 70/18, 19; 132/277
See application file for complete search history.

(56) References Cited

U.S. PATENT DOCUMENTS

| | | | |
|---|---|---|---|
| 288,749 A * | 11/1883 | Way | B25B 5/06 |
| 2,531,003 A * | 11/1950 | Slaker | H02G 11/003 |
| | | | 248/63 |
| 6,171,034 B1 | 1/2001 | Burgoon | |
| 6,805,522 B2 | 10/2004 | Condon | |
| 7,572,171 B2 * | 8/2009 | Tsuchida | B24D 15/065 |
| | | | 451/378 |
| 8,172,492 B1 * | 5/2012 | Kelderman | B60P 3/079 |
| | | | 410/23 |
| 2007/0196193 A1 * | 8/2007 | Hill | B60P 7/0823 |
| | | | 410/23 |

* cited by examiner

Primary Examiner — Stephen Gordon
(74) Attorney, Agent, or Firm — Steven Rinchart (57) ABSTRACT

A device and method for stabilizing a vehicle during transport provides a detachably attached anchoring point on a vehicle for a tethered cable to securely fasten to from multiple directions and with strong tensions on the tethered cable. This creates a unique anchor on the vehicle that helps stabilize the vehicle during transport while minimizing damage to the vehicle. The device utilizes a biased, spring hinge to pivotally enclose a linear member, such as a grip, on the vehicle. A fastener at the terminus of the cable flexibly and detachably joins with the device at apertures. Tabs extend from the device to facilitate gripping for moving the device between an open and a closed position. The device may detachably attach to multiple areas of the vehicle, and multiple devices may be used throughout the vehicle. These flexible, multi-positional features of the device increase the effectiveness of the tethered cables.

1 Claim, 5 Drawing Sheets

SHACKLE AND METHOD FOR STABILIZING A VEHICLE DURING TRANSPORT

FIELD OF THE INVENTION

This invention relates to a device and method for stabilizing a vehicle during transport, and more particularly relates to a device that hingedly clamps around a linear member of a vehicle to form a detachably attached anchoring point on the vehicle that enables a tethered cable to securely fasten to the device from multiple directions and with strong tensions for stabilizing the vehicle during transport.

DESCRIPTION OF THE RELATED ART

Typically, the fastening or securing of a load to its carrier by use of ropes, cables, or other means is used to prevent shifting or damage to a vehicle during transport. Tie down cables are especially effective to hold down motorcycles during transport. The tie down cables generally anchor to the transporting vehicle from one end, and to the motorcycle from an opposite end. Generally, the tension created on the cable maintains the motorcycle in a desired upright position.

It is known in the art that motorcycles are commonly transported in the bed of a pickup truck, flatbed trailer, or other transportation vehicle having no inherent apparatus for supporting the motorcycle in an upright position. Normally the motorcycle is positioned on the bed of the transportation vehicle and secured in an upright position with tie down cables connected to the transportation vehicle and connected directly to the motorcycle.

In many instances, the tie down cables are commonly attached to the motorcycle's hand grips as the hand grips are the structural components of the motorcycle positioned most vertically and laterally distal the motorcycle's center of gravity. By attaching the straps at these points, the motorcycle is better stabilized in an upright position as the supporting force is exerted on the motorcycle at points laterally equidistant to the motorcycle's center of gravity and with a maximum leverage force relative thereto.

However, most motorcycles do not have any readily available point of attachment for tie downs in transporting the motorcycles. Finding a stable point of attachment that is secure, accessible from multiple directions, and does not damage the motorcycle can be problematic.

It is known that prior art motorcycle restraint devices often scratch or indent the motorcycle when the restraint is fastened to the handle bar. Often a tie-down rod includes hose clamps and a pins which, when secured to the frame of the motorcycle, scratch the paint on the frame and possibly indent the frame. Furthermore, many parts on the motorcycle are moving, i.e., wheels, handle bar frame. This is not conducive to a stable anchoring point for the tie down cable.

One attempted tie down attachment apparatus is the Canyon Dancer harness, which is a tie down system for motorcycles. The Canyon Dancer harness operates by cupping the end of the motorcycle handlebar. However, this terminal cupping arrangement is not effective with motorcycles with bar end attached hand/lever guard because the bar end access is being blocked by the attached hand/lever guard.

Yet another problem is that the tie-downs are generally made of nylon, leather or other slightly elastic material. In order to insure that the straps remain taught, the forks of the motorcycle are greatly compressed before tightening the straps to account for stretching during travel. However, compression of the motorcycle forks is undesirable and causes damage over a long period of time.

Current methods and apparatii do not readily provide a stabilizing device that hingedly clamps around a linear member of a vehicle to form a detachably attached anchoring point on the vehicle that enables a tethered cable to securely fasten to the device from multiple directions and with strong tensions for stabilizing the vehicle during transport. It is therefore desirable that a stabilizing device that securely and safely anchor to at least one linear member on a vehicle for attaching a tethered cable from multiple directions for stability of the vehicle during transport is disclosed.

SUMMARY OF THE INVENTION

From the foregoing discussion, it should be apparent that a need exists for a device that firmly and safely clamps around a linear member of a vehicle to form a detachably attached anchoring point on the vehicle that enables a tethered cable to securely fasten to the device from multiple directions and with strong tensions for stabilizing the vehicle during transport.

Beneficially, such a system would overcome many of the difficulties of the prior art by providing a secure, yet flexible anchoring point on the vehicle that a tethered cable attaches to from multiple directions and with strong tensions, while minimizing damage to the vehicle. The device includes a shackle that is biased to hingedly clamp around a linear member of a vehicle, such as a hand grip or handle bar region of a cycle. The shackle includes a pair of clamp halves that pivotally enclose around the linear member of the vehicle. A fastener, such as a hook, detachably attaches to apertures in the shackle. The fastener joins with a tethered cable that extends from a mounting surface. The tethered cable may join the shackle at the fastener from multiple directions and with strong tensions to optimize stability of the vehicle during transport.

The present invention has been developed in response to the present state of the art, and in particular, in response to the problems and needs in the art that have not yet been fully solved by currently available apparatii and methods. Accordingly, the present invention has been developed to provide a device and method that provides a secure point of attachment on a vehicle for attaching a tethered cable to the vehicle, such that the vehicle is stabilized during transport.

The vehicle stabilization device provides at least one anchoring point on a vehicle for a tethered cable to securely fasten from multiple directions and with strong tensions on the tethered cable. The device may detachably attach to multiple areas of the vehicle, and multiple devices may be used throughout the vehicle. These flexible, multi-positional features of the device increase the effectiveness of the tethered cables, especially in tight spaces or when supporting heavy vehicles. This creates a unique anchor mechanism that detachably attaches to the vehicle for optimal stability of the vehicle during transport.

The device utilizes a biased, clam shell spring hinge to pivotally enclose a linear member on the vehicle. A fastener at the terminus of the tethered cable flexibly and securely detachably joins with the device through strategically placed apertures. Tabs extend from the device to facilitate gripping for moving the device between an open and a closed position. The device may detachably attach to multiple areas of the vehicle, and multiple devices may be used throughout the vehicle. These flexible, multi-positional features of the device increase the effectiveness of the tethered cables; especially in tight spaces or for heavy vehicles.

In some embodiments, the device may include a shackle having a generally circular center portion and a generally tubular shape. The shackle is configured to pivotally enclose a linear member of a vehicle. The vehicle may include a cycle. The linear member may include a grip, a handle bar, or a frame spoke on the cycle.

The shackle includes a pair of clamp halves that pivotally enclose around the linear member of the vehicle. The pair of clamp halves are defined by a hinge end and a mount end. The clamp halves are configured to pivot at the hinge end relative to each other, up to 180°, between a closed position and an open position. In the closed position, the shackle fully encloses and snugly retains the linear member. In the open position, the shackle is disengageable from the linear member.

This pivotal motion for closing and opening the shackle around the linear member of the vehicle serves to minimize obstructions from ancillary members of the vehicle, such as a hand lever guard on the handle bar. This is because the pivoting mechanism negates the need to fasten the shackle to the terminus of the linear member, or perform slidable manipulations with the shackle before clamping down on the linear member.

The clamp halves hingedly connect at their hinge ends at a spring hinge. The spring hinge is configured to bias the shackle towards the closed position. The clamp halves are operable to close and open around the linear member, such that obstruction from an ancillary member of the vehicle, such as a hand lever guard on the handle bar, is minimized. This is because the pivotal motion of the clamp halves negates the need to fasten the shackle to the terminus of the linear member, or slide along the shackle before clamping to the closed position along linear member.

The shackle further includes a pair of spring tabs that provide a gripping surface for pivotal manipulation of the clamp halves between the open and closed positions. The pair of spring tabs are disposed to extend from the hinge end at about 45° relative to each other. The shackle further includes a pair of mount tabs disposed to extend from the mount end of the pair of clamp halves. The pair of mount tabs are disposed to extend from the mount end in a coplanar disposition relative to each other. In one alternative embodiment, the shackle includes only one mount tab that extends from the mount end of the clamp halves.

The shackle also includes at least one aperture disposed in each mount tab. The at least one aperture is configured enable passage of at least one fastener that is attached to a tethered cable. In one embodiment, the fastener is a hook. The fastener forms a generally flexible attachment to the aperture, such that the tethered cable may join the device from a plurality of directions and at large tensions. In this manner, multiple tethered cables may join with one or more devices to help stabilize the vehicle in a desired orientation during transport. In one embodiment, multiple hooks that are connected to multiple tethered cables may pass through the aperture.

The device, in one embodiment, is configured to stabilize a vehicle that is being transported by providing a point of attachment for secure fastening with multiple tethered cables from different directions.

The device is further configured, in one embodiment, to pivotally enclose a linear member, such as a grip, a handle bar, and a frame spoke on a cycle.

In a further embodiment, the device may be configured to bias towards a closed position, such that the shackle securely grips the linear member.

The device is further configured, in one embodiment, to enable opening and closing of the shackle through a pair of spring tabs.

In a further embodiment, the device may be configured to enable passage of a fastener, such as a hook, through the at least one aperture in the mount tabs.

The device is further configured, in one embodiment, to form a point of attachment at multiple linear members on a cycle, such as the grips, handle bars, frame spokes, and wheel.

In a further embodiment, the device may be configured to be manufactured inexpensively.

A method of the present invention is also presented for stabilizing a vehicle with a stabilizing device. The method in the disclosed embodiments substantially includes the steps necessary to carry out the functions presented above with respect to the operation of the described stabilizing device. In one embodiment, the method includes: orienting a shackle in coplanar alignment with a linear member of a vehicle; pressing together a pair of spring tabs to pivot a pair of clamp halves to an open position; positioning the open clamp halves in alignment with the length of the linear member; enabling a biased pivotal movement of the clamp halves towards a closed position over the linear member; enabling passage of a fastener through at least one aperture in a pair of mount tabs; attaching at least one tethered cable to the fastener, wherein the at least one tethered cable is oriented from at least one direction; and stabilizing the vehicle.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the Invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

As referenced in FIGS. 1-5, a vehicle stabilization device 100, hereafter "device" provides a detachably attached anchoring point on a vehicle 200 for a tethered cable 206 to securely fasten from multiple directions and with strong tensions on the tethered cable 206. This creates a unique anchor on the vehicle 200 that helps stabilize the vehicle 200 during transport. The device anchors to the vehicle 200 through an easy on-easy off hinged relationship that minimizes damage to the vehicle 200.

Figure 1:
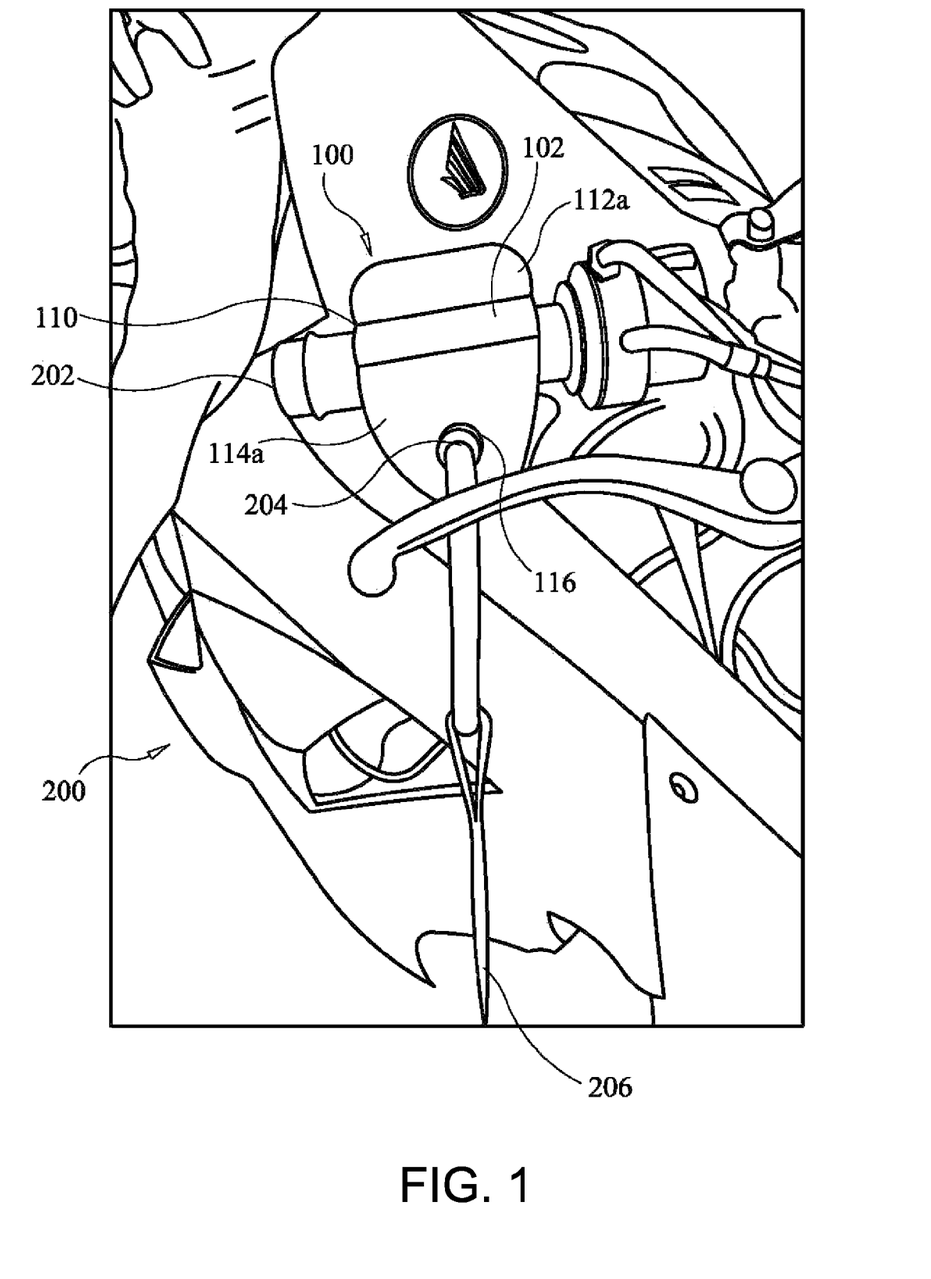
FIG. 1 is a top perspective view of a shackle attached to a fastener and a tethered cable stabilizing a vehicle in accordance with the present invention.

As referenced in FIG. 1, the device 100 utilizes a biased, clam shell hinging mechanism to pivotally enclose a linear member 202 on the vehicle 200. A fastener 204 at the terminus of the tethered cable 206 flexibly and detachably joins with the device 100 through strategically placed apertures 116. Tabs extend from the device 100 to facilitate gripping for moving the device 100 between an open and a closed position. The device 100 may detachably attach to multiple areas of the vehicle 200, and multiple devices 100 may be used throughout the vehicle 200. These flexible, multi-positional features of the device 100 increase the effectiveness of the tethered cables 206; especially in tight spaces or for heavy vehicles 200.

In some embodiments, the vehicle 200 may include, without limitation, a cycle, a motorcycle, a dirt bike, a cruiser, a scooter, a three-wheeler, an off road vehicle, a bicycle, and a tricycle. The linear member 202 may include, without limitation, a grip, a handle bar, a frame spoke, a wheel hub, and a seat that make up components of the vehicle 200. Generally, the linear member 202 is a stable, elongated section of the vehicle 200. The tethered cable 206 may include, without limitation, a bungee cord, a nylon cord, a rope, a chain, and a tow line. The fastener 204 may include, without limitation, a hook, a screw, a clamp, and a magnet. In one embodiment, the device 100 attaches to multiple areas of the vehicle 200, multiple tethered cables 206 attach to the device 100 from different directions, and the vehicle 200 is positioned in an upright orientation during transport.

For example, without limitation, a motorcycle is positioned on the bed of a truck during transport and secured in an upright position with four tethered cables connected to the truck and connected directly to the motorcycle. The four tethered cables are attached to the motorcycle's hand grips. Those skilled in the art will recognize that the hand grips are the structural components of the motorcycle positioned most vertically and laterally distal the motorcycle's center of gravity. By attaching the straps at these points, the motorcycle is better stabilized in an upright position as the supporting force is exerted on the motorcycle at points laterally equidistant to the motorcycle's center of gravity and with a maximum leverage force relative thereto.

In this example, the four tethered cables extend from each corner of the bed of the truck. Two devices 100 attaches to each hand grip on the motorcycle, such that a forward tethered cable and a rearward tethered cable from each side of the truck fasten to the most proximal device 100. During transport on the road, the tension from the cables and the flexible connection between the four tethered cable and the device 100 enable the motorcycle to remain stable and upright, while also allowing a certain latitude of free play.

Figure 2:
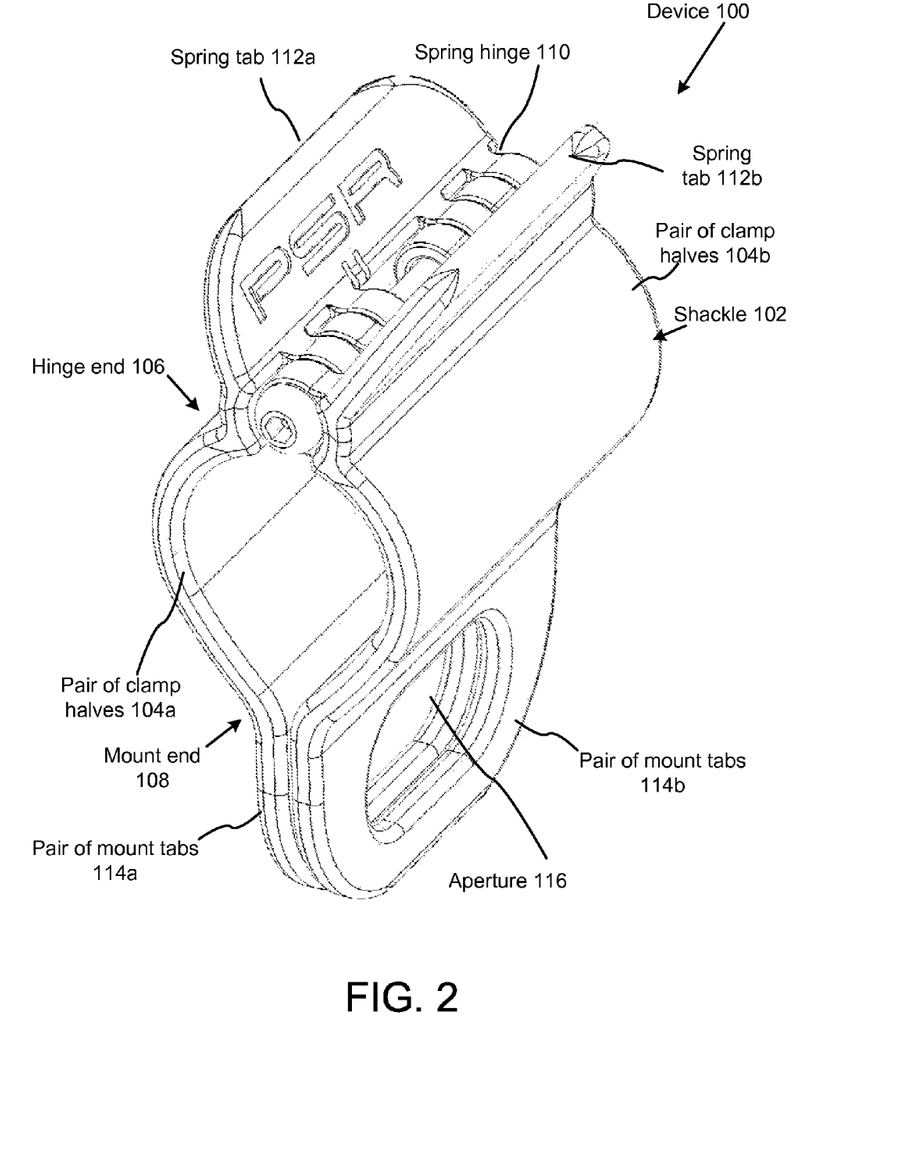
FIG. 2 is a perspective view of a stabilizing device having a pair of mount tabs in accordance with the present invention.

Turning now to FIG. 2, the device 100 may include a shackle 102. The shackle is defined by a generally circular center portion and a generally tubular shape. Though in other embodiments, the shackle 102 could have other shapes, including, square, rectangular, and pyramidal. The shackle 102 is constructed from a generally sturdy material, which may include, without limitation, a metal or a rigid polymer. The shackle 102 is configured to pivotally enclose a linear member 202 of a vehicle 200 and form a generally snug fit around the linear member 202.

The shackle 102 includes a pair of clamp halves 104a-b that pivotally enclose around the linear member 202 of the vehicle 200. The pair of clamp halves 104a-b are defined by a hinge end 106 and a mount end 108. The hinge end 106 pivots in relation to movement between each clamp half 104a-b. The mount end 108 forms the terminus edge for the clamp halves 104a-b. In one embodiment, the clamp halves 104a-b are configured to pivot at the hinge end 106 relative to each other, up to 180°, between a closed position and an open position. In the closed position, the shackle 102 fully encloses and snugly retains the linear member 202. In the open position, the shackle 102 may disengage from the linear member 202.

Those skilled in the art will recognize that the pivotal motion for closing and opening the shackle 102 around the linear member 202 of the vehicle 200 serves to minimize obstructions from ancillary members of the vehicle 200, such as a hand lever guard on the handle bar. This is because the pivotal motion of the clamp halves 104a-b negates the need to fasten the shackle 102 to the terminus of the linear member 202, or slide along the shackle 102 before clamping to the closed position along linear member 202.

The clamp halves 104a-b hingedly connect at their hinge ends 106 at a spring hinge 110. The spring hinge 110 may include a tensioned barrel, a pin, and a spring that work together to bias the spring hinge 110 in a first direction. In one embodiment, the spring hinge 110 is configured to bias the shackle 102 towards the closed position. As discussed above, the pivotal relation between clamp halves 104a-b closes and opens around the linear member 202 while negating the need to fasten the shackle 102 to the terminus of the linear member 202, or slide along the shackle 102 before clamping to the closed position along linear member 202.

The shackle 102 further includes a pair of spring tabs 112a-b that provide a gripping surface for pivotal manipulation of the clamp halves 104a-b between the open and closed positions. The spring tabs 112a-b may be pressed towards each other to move the shackle 102 to the open position. The spring tabs 112a-b may then be released to the closed position. In one possible embodiment, the pair of spring tabs 112a-b are disposed to extend from the hinge end 106 at about 45° relative to each other. In one possible embodiment, the spring tabs 112a-b form a flat, elongated plate with rounded edges.

The shackle 102 further includes a pair of mount tabs 114a-b disposed to extend from the mount end 108 of the pair of clamp halves 104a-b. The pair of mount tabs 114a-b are disposed to extend from the mount end 108 in a coplanar disposition relative to each other. The mount tabs 114a-b may include a flat, elongated plate having rounded edges. Additionally, any number of apertures 116 may be used in the mount tabs 114a-b. Multiple fasteners 204 may also attach to the apertures 116 in the mount tabs 114a-b.

Figure 3:
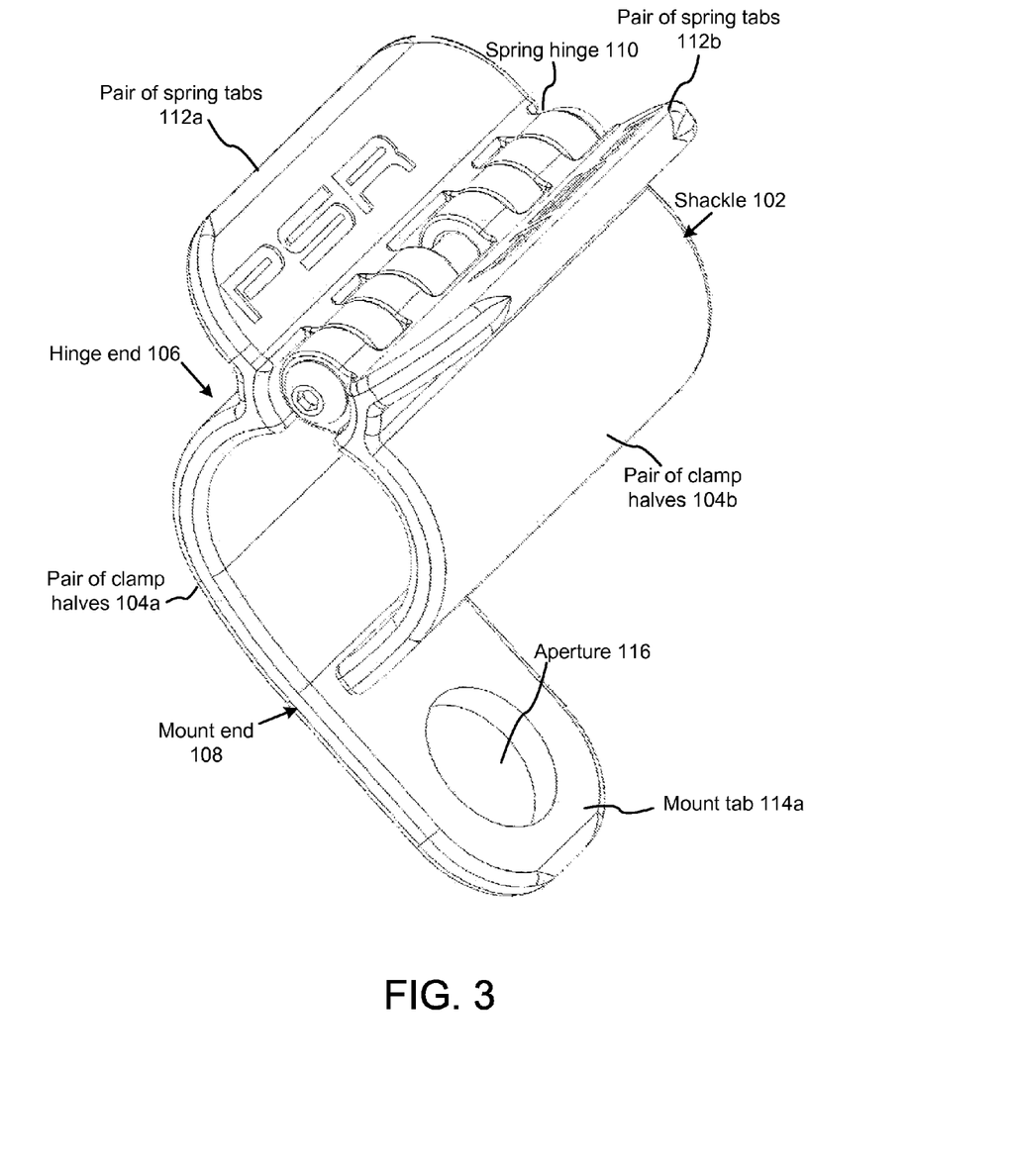
FIG. 3 is a perspective view of a stabilizing device having one mount tab in accordance with the present invention.

FIG. 3 illustrates an alternative embodiment in which the shackle 102 includes only one mount tab 114a that extends from either one of the mount ends 108 of the clamp halves 104a-b. In this embodiment, the aperture 116 may be oval shaped and receive one or two fasteners 204 for attachment. In a one hook attachment, the orientation of the tethered cable 206 may be either forward or rearward facing relative to the vehicle 200. However, in the two hook attachment, the tethered cable 206 may be attached in the opposite direction; thus holding the vehicle 200 stationary. In yet another embodiment, the mount tab 114a contains two round shaped apertures in a crisscrossed configuration. This configuration enables two tethered cables 206 and fasteners 204 to pull the vehicle 200 in opposite directions for optimal stability.

Figure 4:
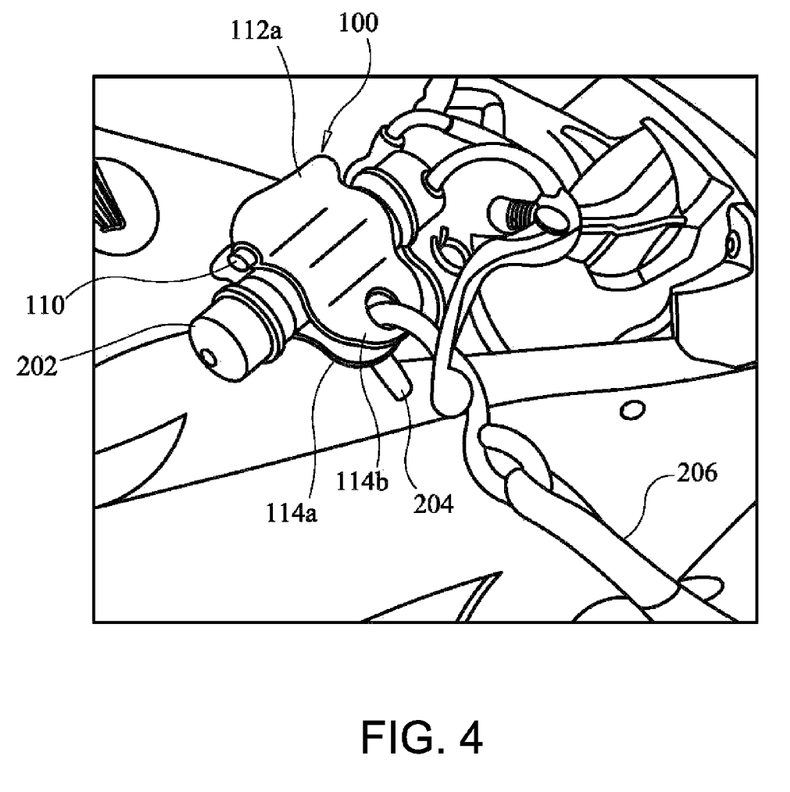
FIG. 4 is a top perspective view of a fastener passing through an aperture on the mount tab in accordance with the present invention.

As discussed above, the pair of mount tabs 114a-b include at least one aperture 116 disposed in each mount tab 114a-b. The aperture 116 is configured enable passage of a fastener 204 that is attached to a tethered cable 206. The aperture 116 may be shaped as a circle, an oval, a square, or a rectangle. In one embodiment, the fastener 204 that passes through the aperture 116 is a hook. As shown in FIG. 4, the fastener 204 forms a generally flexible attachment to the aperture 116, such that the tethered cable 206 may join the device 100 from a plurality of directions and at large tensions.

This loose, yet secure connection between the fastener 204 and the aperture 116 enable fast connecting and disconnecting, and provides free play to the vehicle 200 during transport, such that the tethered cable 206 is not overly rigid. In this manner, multiple tethered cables 206 may join with one or more devices 100 to help stabilize the vehicle 200 in a desired orientation during transport. In one embodiment, multiple hooks that are connected to multiple tethered cables 206 may pass through the aperture 116.

Figure 5:
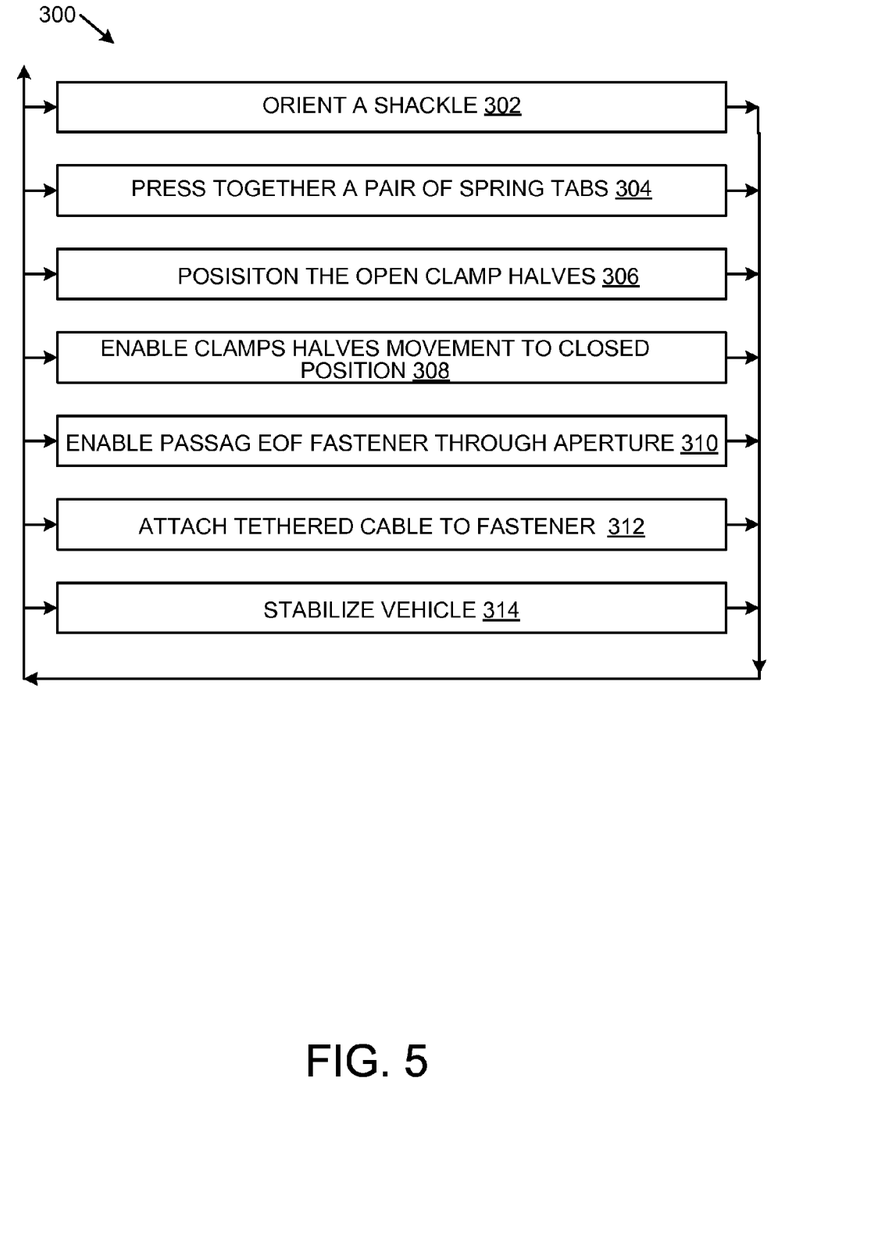
FIG. 5 is a flowchart diagram of method for stabilizing a vehicle with a stabilizing device in accordance with the present invention.

FIG. 5 illustrates a flowchart diagram of an exemplary method 300 for stabilizing a vehicle 200 with a stabilizing device 100. The method 300 may include an initial Step 302 of orienting a shackle 102 in coplanar alignment with a linear member 202 of a vehicle 200. The shackle 102 is positioned to enclose the linear member 202 for anchoring thereto. The linear member 202 may include, without limitation, a grip, a handle bar, a frame spoke, a wheel hub, and a seat that make up the vehicle 200.

The method 300 may further comprise a Step 304 of pressing together a pair of spring tabs 112a-b to pivot a pair of clamp halves 104a-b to an open position. The spring tabs 112a-b extend at an angle from a hinge end 106 of the pair of clamp halves 104a-b. The spring tabs 112a-b may be pressed towards each other to move the shackle 102 to the open position. The spring tabs 112a-b may then be released to the closed position.

A Step 306 includes positioning the open clamp halves 104a-b in alignment with the length of the linear member 202. From this position, the shackle 102 can cover the linear member 202. In some embodiments, a Step 308 comprises enabling a biased pivotal movement of the clamp halves 104a-b towards a closed position over the linear member 202. This may be accomplished by releasing the spring tabs 112a-b to pivot to the closed position over the linear member 202. A snug fit may form between the shackle 102 and the linear member 202.

A Step 310 includes enabling passage of a fastener 204 through at least one aperture 116 in a pair of mount tabs 114a-b. In one embodiment, the fastener 204 that passes through the aperture 116 is a hook. The fastener 204 forms a generally flexible attachment to the aperture 116, such that the tethered cable 206 may join the device 100 from a plurality of directions and at large tensions.

In some embodiments, a Step 312 may include attaching at least one tethered cable 206 to the fastener 204, wherein the at least one tethered cable 206 is oriented from at least one direction. The device 100 may detachably attach to multiple areas of the vehicle 200, and multiple devices 100 may be used throughout the vehicle 200. These flexible, multi-positional features of the device 100 increase the effectiveness of the tethered cables 206; especially in tight spaces or for heavy vehicles 200. A final Step 314 comprises stabilizing the vehicle 200. The tension created on the cables 206, and the positioning of the shackles 102 along various sections of the vehicle 200 create stability during transport of the vehicle 200.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A device for stabilizing a vehicle during transport, the device comprising:
   a shackle, the shackle comprising:
      a pair of clamp halves, the pair of clamp halves defined by a hinge end and a mount end, the pair of clamp halves configured to pivot between a closed position and an open position relative to each other;
      a spring hinge, the spring hinge configured to pivotally connect the pair of clamp halves, wherein the spring hinge biases the pair of clamp halves towards the closed position;
      a pair of spring tabs, the pair of spring tabs disposed to extend from the hinge end of the pair of clamp halves, wherein the pair of spring tabs are configured to enable manipulation of the pair of clamp halves towards the open position;
a mount tab, the mount tab disposed to extend from the mount end of the pair of clamp halves;
at least one aperture, the at least one aperture disposed in the mount tab; and
wherein the spring hinge is configured to enable about a 180 degree angle of rotation between each clamp half.

* * * * *